(12) United States Patent
Lilie et al.

(10) Patent No.: US 6,787,942 B2
(45) Date of Patent: Sep. 7, 2004

(54) PROCESS FOR FORMING AN ANNULAR STACK OF METALLIC LAMINATIONS FOR THE STATOR OF A LINEAR MOTOR AND AN ANNULAR STACK OF METALLIC LAMINATIONS

(75) Inventors: Dietmar Erich Bernhard Lilie, Joinville (BR); Egidio Berwanger, Joinville (BR); Rinaldo Puff, Joinville (BR)

(73) Assignee: Empresa Brasileira de Compressores S.A. -Embraco, Joinville (BR)

( * ) Notice: Subject to any disclaimer, the term of this patent is extended or adjusted under 35 U.S.C. 154(b) by 0 days.

(21) Appl. No.: 10/239,003

(22) PCT Filed: Mar. 30, 2001

(86) PCT No.: PCT/BR01/00032

§ 371 (c)(1),
(2), (4) Date: Nov. 1, 2002

(87) PCT Pub. No.: WO01/73923

PCT Pub. Date: Oct. 4, 2001

(65) Prior Publication Data

US 2004/0000833 A1 Jan. 1, 2004

(30) Foreign Application Priority Data

Mar. 30, 2000 (BR) .............................................. 0002187

(51) Int. Cl.[7] .............................................. H02K 41/00
(52) U.S. Cl. ........................... 310/12; 310/42; 310/217
(58) Field of Search ............................... 310/12–15, 17, 310/23, 42, 216–217, 254, 258, 259; 29/596

(56) References Cited

U.S. PATENT DOCUMENTS

| 3,536,941 | A | * | 10/1970 | Tourtellotte ................... 310/27 |
| 4,835,839 | A | * | 6/1989 | Forbes et al. .................. 29/596 |
| 5,195,231 | A | * | 3/1993 | Fanning et al. ................ 29/596 |
| 5,315,190 | A | * | 5/1994 | Nasar ............................. 310/12 |
| 5,382,860 | A | * | 1/1995 | Fanning et al. ............. 310/216 |
| 5,525,852 | A | * | 6/1996 | Fanning et al. ............. 310/217 |
| 5,642,011 | A | * | 6/1997 | Fanning et al. ............. 310/216 |
| 5,894,182 | A | * | 4/1999 | Saban et al. ................. 310/217 |
| 5,945,748 | A | * | 8/1999 | Park et al. ..................... 310/12 |
| 6,060,810 | A | * | 5/2000 | Lee et al. ..................... 310/254 |
| 6,169,350 | B1 | * | 1/2001 | Yang ........................... 310/216 |
| 6,249,072 | B1 | * | 6/2001 | Sakagami et al. .......... 310/217 |
| 6,483,221 | B1 | * | 11/2002 | Pawellek et al. ........... 310/216 |

FOREIGN PATENT DOCUMENTS

| EP | 0 345 916 | 12/1989 | .......... H02K/44/06 |
| FR | 2 539 257 | 7/1984 | ............ H02K/1/16 |
| JP | 01 321850 | 12/1989 | .......... H02K/29/00 |
| JP | 10 322945 | 12/1998 | ............ H02K/1/18 |

\* cited by examiner

*Primary Examiner*—Dang Le
(74) *Attorney, Agent, or Firm*—Darby & Darby

(57) ABSTRACT

A process for forming an annular stack of metallic laminations for the stator of a linear motor and an annular stack of metallic laminations. Said process comprises the steps of: a—providing a rectilinear alignment for a plurality of metallic laminations (10) having their internal edges (11) mutually seated and defining a flat surface (15); b—affixing to each other the internal edges (11) of the rectilinear alignment of the metallic laminations (10), in order to allow only the relative and limited angular displacement of each said metallic lamination (10) around its respective internal edge (11); and c—deforming the alignment of the metallic laminations (10) affixed to each other to an annular configuration, with the internal edges (11) of the metallic laminations (10) defining an internal cylindrical surface (16) of said annular stack.

13 Claims, 2 Drawing Sheets

PROCESS FOR FORMING AN ANNULAR STACK OF METALLIC LAMINATIONS FOR THE STATOR OF A LINEAR MOTOR AND AN ANNULAR STACK OF METALLIC LAMINATIONS

FIELD OF THE INVENTION

The present invention refers to a process for forming an annular stack of laminations for the stator of an electric motor of the linear type, particularly for the mutual fixation of the metallic laminations of the annular stack of laminations.

BACKGROUND OF THE INVENTION

In the manufacture of a hermetic compressor for refrigeration with a linear motor, there are several components that constitute the compressor, one of them being the linear motor. This type of motor consists of an assembly of metallic laminations made of steel, which are radially packed, forming the stator of the electric motor on which is wound a copper wire, in order to form the induction coil of the motor.

The linear motor further has another assembly of metallic laminations, which also forms a radial stack, denominated external annular stack, which defines, with the stator, an annular space inside which moves the magnetic impeller, whose function is to produce the linear movement of the piston of the compressor, so that said piston may provide gas compression inside the cylinder of the compressor.

Some processes for forming the annular stack of metallic laminations for the stator of an electric motor of the linear type are well known. In one of said processes, the metallic laminations are individually and manually positioned in a cylindrical body, in order to form the annular configuration. In this positioning process, it is not possible to assure the radial orientation of the metallic laminations (even if an auxiliary circumferential belt is used for the assembly), which orientation is important for a good performance of the compressor. The way used for achieving the orientation of the metallic laminations in a uniform radial arrangement in this process of forming the annular stack of laminations is to submit said laminations, after they are placed on the cylindrical body, to a magnetic field, for forcing said metallic laminations to the correct formation, maintaining this distribution until said metallic laminations are affixed in said configuration. In this process, the fixation of the metallic laminations in an annular configuration in the lamination stack is achieved by gluing said laminations after the magnetic field is applied for alignment. This is a complex process, involving many operational steps and requiring much labor, which increases the manufacturing costs.

In another known process for forming the annular stack of laminations (U.S. Pat. No. 5,945,748), the metallic laminations are each provided with a slot in a portion of one of its end edges. Said slots define, upon the circumferential alignment of said metallic laminations, a circumferential housing for receiving a retaining ring. This construction requires, necessarily, the formation of the annular stack of metallic laminations and the radial orientation thereof before the retaining rings are placed.

DISCLOSURE OF THE INVENTION

Thus, it is an object of the present invention to provide a process for forming an annular stack of metallic laminations for the stator of a linear motor, which allows obtaining and maintaining a correct and aligned positioning of the metallic laminations of said lamination stack, without the disadvantages of the known techniques, further allowing the fixation between the metallic laminations of the lamination stack to be achieved before the formation of the annular stack of metallic laminations.

This and other objectives of the present invention are achieved by a process for forming an annular stack of metallic laminations for the stator of a linear motor, from a plurality of metallic laminations, which are radially positioned and have an internal edge and an external edge, said process comprising the steps of: a—providing a rectilinear alignment for a plurality of metallic laminations which are laterally and mutually seated, with their internal edges defining a flat surface; b—affixing to each other the internal edges of the rectilinear alignment of the metallic laminations, in order to allow only the relative and limited angular displacement of each metallic lamination around its respective internal edge; and c—deforming the alignment of the metallic laminations affixed to each other to an annular configuration, with the internal edges of the metallic laminations defining an internal cylindrical surface of said annular stack.

It is a further object of the present invention to provide an annular stack of metallic laminations, such as that considered above.

BRIEF DESCRIPTION OF THE DRAWINGS

The invention will be described below, with reference to the attached drawings, in which.

BEST MODE OF CARRYING OUT THE INVENTION

The present invention is applied to the formation of annular stacks of the metallic laminations of an electric linear motor (generally used in the hermetic compressor of refrigeration systems), each stack being formed by a respective plurality of metallic laminations 10, usually made of steel, as described below.

Figure 1:
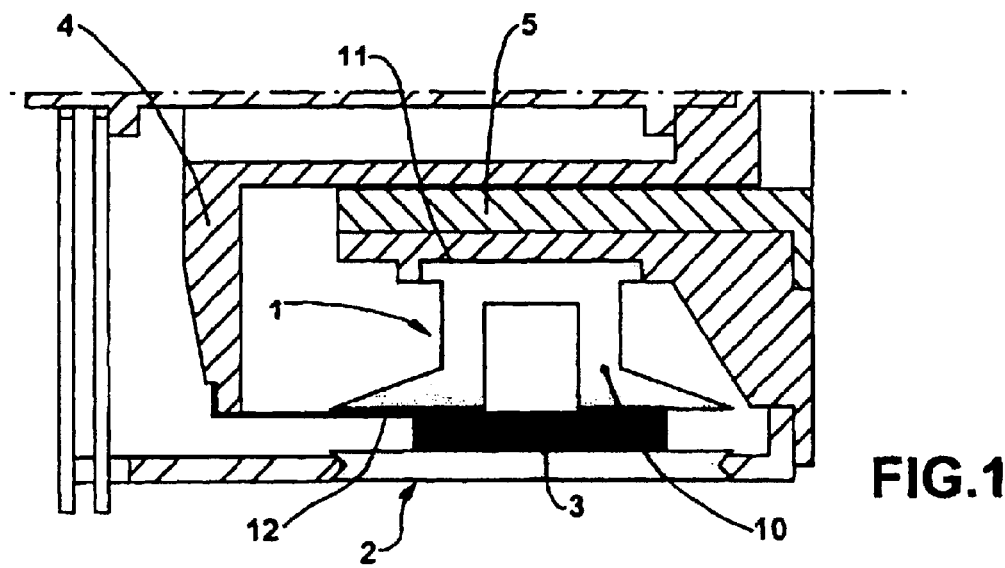
FIG. 1 is a partial sectional view of a linear motor, showing a metallic lamination of an internal annular stack of laminations, and a metallic lamination of an external annular stack of laminations of said linear motor.
Figure 2:
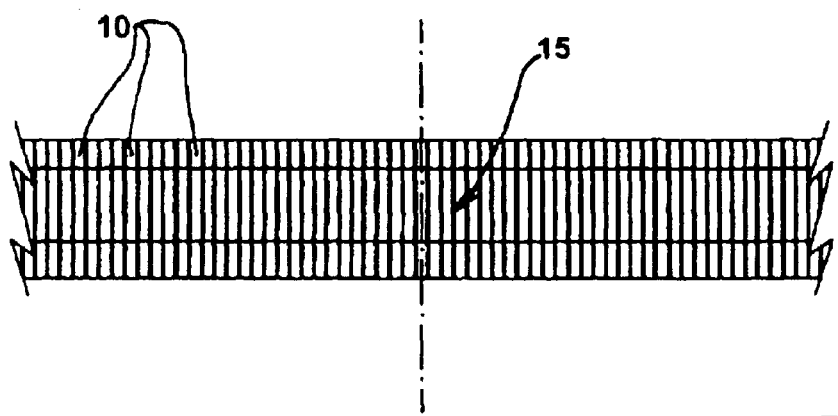
FIG. 2 is a plan view of a rectilinear alignment of the metallic laminations obtained in a phase of the process for forming the annular stack of metallic laminations according to the present invention.
Figure 3:
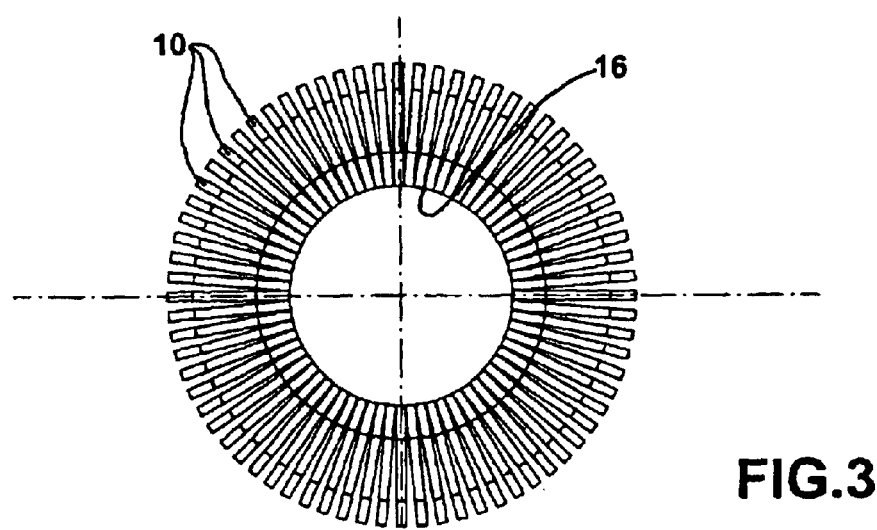
FIG. 3 is an upper view of an annular stack of the metallic laminations obtained according to the present invention.

According to the illustration of FIG. 1, the linear motor of a hermetic compressor includes an internal annular stack 1, which forms the stator of said electric motor and on which is wound a copper wire for the formation of an induction coil (not illustrated).

An external annular stack 2 forms, with the stator, an annular space, inside which moves a magnetic impeller 3, whose function is to promote the linear movement of a piston 4 of the hermetic compressor inside a cylinder 5 of the latter.

Each metallic lamination 10 has an internal edge 11 and an external edge 12, which are parallel to each other and joined by a pair of end edges 13 having an "L" profile, for instance, and defining, as illustrated, a trapezoidal profile for the metallic lamination 10, with the smaller base coinciding with the internal edge 11. Each metallic lamination 10 has, from its external edge 12, a central opening 14, which defines, upon formation of the annular stack, a circumferential housing for receiving the coils that form the stator.

According to the present invention, each annular stack of the metallic laminations 10 is formed from the rectilinear alignment of a determined plurality of metallic laminations 10, which are laterally and mutually seated and have their internal edges 11 defining a flat surface 15, through which the metallic laminations 10 of said lamination stack being formed are affixed to each other.

After the alignment of said plurality of metallic laminations 10, the latter are affixed to each other, so that to allow only the relative and limited angular displacement of each metallic lamination 10 around a rotation axis coinciding with the respective internal edge 11.

After the fixation of the metallic laminations 10 in a rectilinear alignment, the latter are submitted to a step of deforming the alignment to an annular configuration, until an end metallic lamination 10 of said plurality of metallic laminations 10 is seated against another opposite end metallic lamination 10 of said plurality of laminations. Since the metallic laminations 10 are previously affixed to each other, the deformation is achieved by maintaining a homogeneous condition of radial distribution of the laminations, with no need of applying a magnetic field for obtaining said condition. During deformation, only the external edges 12 are angularly displaced to a relative and limited separation from each other. This deformation makes the internal edges 11 define an internal cylindrical surface 16 for said annular stack of metallic laminations 10, with a diameter that is previously calculated as a function of the dimensioning of the mounting region of said annular stack in the electric motor.

Figure 4:
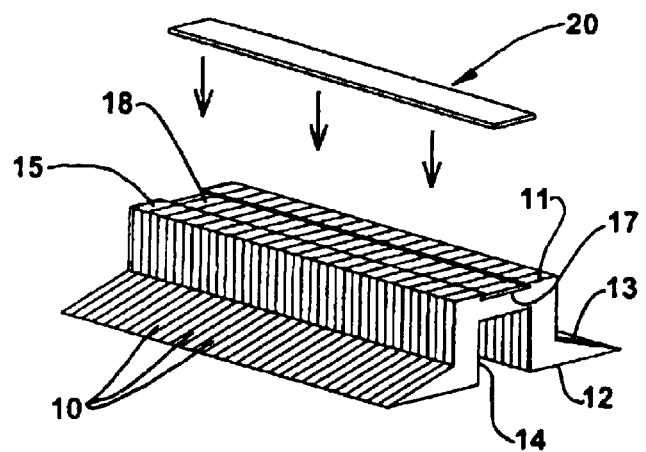
FIG. 4 is a perspective view of a rectilinear alignment of the metallic laminations, which are affixed to each other according to a first way of carrying out the present invention.
Figure 5:
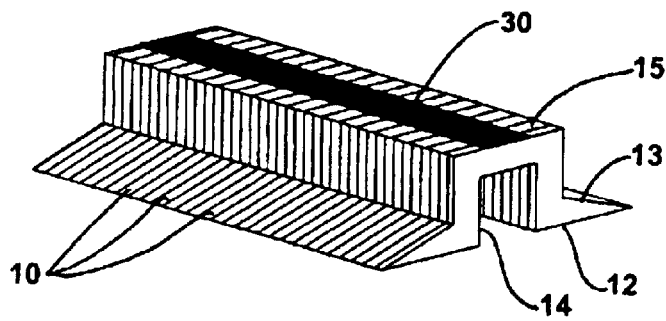
FIG. 5 is a perspective view of a rectilinear alignment of the metallic laminations, which are affixed to each other according to a second way of carrying out the present invention.
Figure 6:
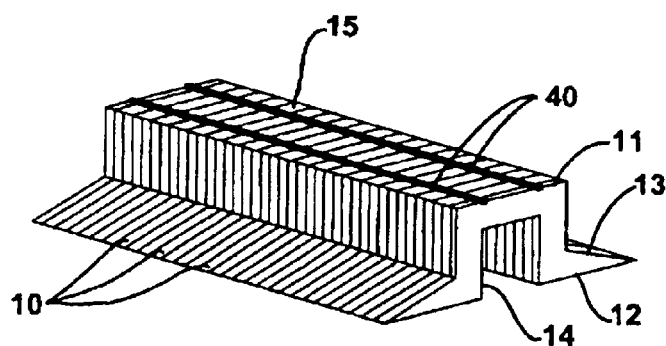
FIG. 6 is a perspective view of a rectilinear alignment of the metallic laminations, which are affixed to each other according to a third way of carrying out the present invention.

The step of affixing the metallic laminations 10 of the plurality of metallic laminations is achieved, according to a way of carrying out the invention illustrated in FIGS. 4–6, by providing a connecting means, which is affixed to the internal edges 11 of the rectilinear alignment of metallic laminations 10 and which is deformable so as to permit the limited angular displacement of the metallic laminations 10 around their respective internal edges 11, from a mutual parallel condition to a mutual angular spacing in the formed annular stack.

In a constructive option illustrated in FIG. 4, the connecting means is in the form of a rod 20 affixed to the internal edges 11 that define the flat surface 15 of the alignment of laminations.

According to the illustration of FIG. 4, the connecting means is affixed inside a housing 17 defined along the assembly of internal edges 11 of the alignment of metallic laminations 10.

The housing 17 is defined by the alignment of cuts 18, for example with a dove tail shape, each cut being provided in a respective internal edge 11 of a metallic lamination 10, for example during stamping thereof.

According to another embodiment of the present invention, as illustrated in FIG. 5, the connecting means is defined by at least one extension of an adhesive film 30, which is provided along the flat surface 15, in order to join all the internal edges 11 of the alignment of metallic laminations 10.

According to another embodiment of the present invention, as illustrated in FIG. 6, the connecting means is defined by at least one extension of weld 40, for example two extensions of weld parallel to each other and provided along the flat surface 15, in order to join all the internal edges 11 of the alignment of metallic laminations 10.

Figure 7:
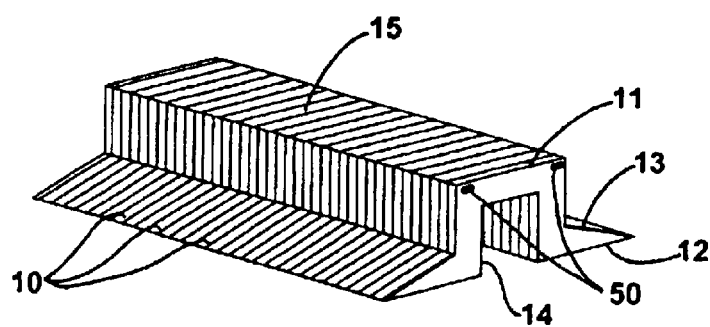
FIG. 7 is a perspective view of a rectilinear alignment of the metallic laminations, which are affixed to each other according to a fourth way of carrying out the present invention.

In another way of carrying out the present invention, as illustrated in FIG. 7, each metallic lamination 10 is provided, for example during stamping thereof and adjacent to the respective internal edge 11, with at least one lowered portion 50 defining a recess in a face of the metallic laminations 10 and, in the opposite face, a projection to be fitted and retained, by interference with elastic deformation, in a respective recess defined in an adjacent metallic lamination 10 upon the rectilinear alignment of the metallic laminations 10.

In the constructive form illustrated in FIG. 7, each metallic lamination 10 is provided with a pair of lowered portions 50, each of the latter being adjacent to an end of the internal edge 11 and defining, for the same face of the respective metallic lamination 10, for example a projection, which is shaped in order that, when fitted in a recess of an adjacent metallic lamination 10, it affixes said adjacent metallic laminations 10 to each other against involuntary separations, but allowing the limited angular displacement of the metallic laminations 10 around their respective internal edges 11, from a mutual parallel condition to a mutual angular spacing condition in said annular stack.

These solutions for forming the annular stack of metallic laminations have some advantages over the known processes for forming the annular stack of laminations, such as lower cost of the mounting process, less time spent for the circumferential assembly of the lamination stack, reduced number of components in the compressor, and fewer steps in the production process for obtaining the lamination stack.

What is claimed is:

1. A process for forming an annular stack of metallic laminations for the stator of a linear motor, from a plurality of metallic laminations (10), which are radially positioned and have an internal edge (11) and an external edge (12), comprising:

providing a rectilinear alignment for a plurality of metallic laminations (10) which are laterally and mutually seated, with their internal edges defining a flat surface (15);

affixing to each other the internal edges (11) of the rectilinear alignment of the metallic laminations (10), in order to allow only the relative and limited angular displacement of each said metallic lamination (10) around its respective internal edge (11); and deforming the alignment of the metallic laminations (10) affixed to each other to an annular configuration, with the internal edges (11) of the metallic laminations (10) defining an internal cylindrical surface (16) of said annular stack.

2. The process, according to claim 1 wherein the mutual fixation of the internal edges (11) of the metallic laminations (10) comprises the step of affixing, to each internal edge (11)

of the alignment of metallic laminations (10), a connecting member (20,30,40).

3. The process, according to claim 2, wherein the connecting member is placed in a respective housing (17) provided in said flat surface (15).

4. The process, according to claim 3, wherein the housing (17) is defined by an alignment of cuts (18), with a dove tail shape and provided in the internal edge (11) of the metallic laminations (10).

5. Process, according to claim 4, wherein the connecting member is a rod (20).

6. The process, according to claim 2, wherein the connecting member is defined by at least one extension of adhesive film (30) provided along the flat surface (15).

7. The process, according to claim 2, wherein the connecting member is defined by at least one extension of weld (40) provided along the flat surface (15) and mutually affixing the internal edges (11) of the alignment of metallic laminations (10).

8. The process, according to claim 1, further comprising:
providing each metallic lamination (10), adjacent to its respective internal edge (11), with a lowered portion (50) defining a recess in a face of the metallic lamination (10) and, in the other face, a projection to be fitted in a recess defined in an adjacent metallic lamination (10).

9. An annular stack of metallic laminations for the stator of a linear motor, comprising:
a plurality of metallic laminations (10), which are radially positioned in an annular arrangement, having an internal edge (11) and an external edge (12), and which are laterally and mutually seated by their internal edges (11) that define an internal cylindrical surface (16) of said annular stack; and
a connecting member (20,30,40), which is affixed to the internal edges (11) of the plurality of metallic laminations (10) and which is deformable in order to allow the limited angular displacement of the metallic laminations (10) around their respective internal edges (11), from a mutual parallel condition to a mutual angular spacing condition in the annular stack.

10. The annular stack, according to claim 9, further comprising:
a housing (17), which is provided in a flat surface (15) defined by the mutual seating of the internal edges (11) of the alignment of the metallic laminations (10), and in which is placed the connecting member in the form of a rod (20).

11. The annular stack, according to claim 10, wherein each metallic lamination (10) is provided, in its respective internal edge (11) with a cut (18), the alignment of said cuts (18) defining the housing (17).

12. The annular stack, according to claim 11, wherein the housing (17) has a dove tail profile for fitting the rod (20).

13. An annular stack of metallic laminations for the stator of a linear motor, comprising:
a plurality of metallic laminations (10), which are radially positioned in an annular arrangement, having an internal edge (11) and an external edge (12), and which are laterally and mutually seated by their internal edges (11) that define an internal cylindrical surface (16) of said annular stack,
wherein each metallic lamination (10) has, adjacent to the respective internal edge (11), at least one lowered portion (50) defining a recess in a face of the metallic lamination (10) and, in the other face, a projection to fit in a recess defined in an adjacent metallic lamination (10), but still allow for limited annular displacement of the metallic laminations (10) around their respective internal edges (11), such that the metallic laminations stacked rectilinearly is displaced annually about the internal edges with angular spacing between the metallic laminations.

* * * * *